United States Patent [19]

Bushue et al.

[11] Patent Number: 5,077,782
[45] Date of Patent: Dec. 31, 1991

[54] EXTERNAL ANALOG LOOPBACK

[75] Inventors: Carl J. Bushue, Olathe; Theodore S. Holdahl, Lake Quivira, both of Kans.

[73] Assignee: Sprint International Communications Corp., Reston, Va.

[21] Appl. No.: 616,672

[22] Filed: Nov. 21, 1990

[51] Int. Cl.$^5$ ............................................. H04M 1/24
[52] U.S. Cl. .......................................... 379/5; 379/29; 379/28; 375/10
[58] Field of Search ........................ 379/5, 27, 29, 28; 375/10

[56] References Cited

U.S. PATENT DOCUMENTS 4,918,623  4/1990  Lockitt et al. ...................... 375/10

FOREIGN PATENT DOCUMENTS 0158247  6/1990  Japan .................................. 375/10

*Primary Examiner*—Stafford D. Schreyer
*Attorney, Agent, or Firm*—Leitner, Greene & Christensen

[57] ABSTRACT

A method and apparatus for providing troubleshooting capability in a four wire telephone line employing a V.32-type or other unbalanced modem in a local communication link at one or both ends of the telephone line for a data network. Each modem has its own transmitter and receiver. An activatable but normally inhibited analog loopback is installed externally of the modem within the local link with which the modem is associated, with no loopback connection between the transmitter and the receiver within the modem itself. The external loopback is activated while the modem is induced to transmit a call connection signal, so that by virtue of the external loopback the signal is fed back to the receiver of the same modem to permit testing of the operativeness of the modem and the related portion of the link. The external loopback may be activated from terminal equipment on the local link with which the modem is associated, or may be activated from a point of the network remote from the local link.

6 Claims, 2 Drawing Sheets

EXTERNAL ANALOG LOOPBACK

BACKGROUND OF THE INVENTION

The present invention relates generally to four wire leased line telecommunication circuits, and more particularly to improved methods of troubleshooting for such circuits where V.32 technology modems or other unbalanced modems are utilized.

V.32 modems are desirable because they provide the ability to use a PSTN (Public Switched Telephone Network) to back up a leased line facility with a single two wire dial telephone line. The dial facilities employ significantly different routing from the leased line facilities, and therefore provide reliable service when leased facilities are inoperative.

In addition, V.32 modems used in the four wire leased line mode are relatively low priced compared to modems which use prior technologies, such as V.29 and V.27. However, the V.32 modem possesses certain disadvantages relative to V.29 or V.27 modems when the leased line facility or local equipment is down (i.e., has experienced a failure). Techniques previously established for testing the leased line facility have utilized a loopback provided by the facility telephone company, but this CCITT V.45 loop 4 which is established "in a separate unit" (that is, not in the Data Communication Equipment, or DCE) is not usable with conventional V.32 modems.

The problem with using current loopback testing techniques is that the V.32 modem specification is based on a dial environment and is not symmetrical (i.e., is unbalanced). The modem specification defines an originate entity and an answer entity which are non-symmetrical because their functions and operation are different and are not interchangeable. An example of the differences is that the answer modem initially transmits tones to begin the "handshake" sequence while the originate modem is silent. That is, in a standard call set up procedure, the originate side of the connection sought to be established must receive an answer back tone at its receiver before its transmitter is capable of sending information. There are other differences in the performance of the two modems both during handshake and afterward, but this is the principal difference which creates the need for differences in the testing procedure at installation and for maintenance, when compared to prior modem technologies. For example, V.29 and V.28 modem leased line technologies are balanced in that, while both ends of a circuit have independent transmit and receive functions, there is no apparent difference in operation between the two ends, at least for testing purposes.

It is therefore a principal object of the present invention to provide improved methods an- systems to allow troubleshooting four wire leased line telecommunication circuits when V.32 technology modems are employed in conjunction with such circuits.

SUMMARY OF THE INVENTION

The present invention uses a technique similar to the conventional technique of employing a local analog loopback. Significantly, however, although the V.32 modem on the leased line facility is placed in a similar mode, no connection is made between the transmitter and the receiver within the modem itself. Rather, the loopback is provided externally, at a location which is remote from, and yet sufficiently close to the V.32 or other unbalanced modem, to isolate the location of the source of the failure. The technique is especially effective to identify whether the problem is at the modem end or on the leased line itself so that responsibility for correction of the failure can be assigned to the proper party, namely the customer (or equipment supplier) or the telephone company. This technique or mode is referred to herein as an external analog loopback.

By means of the external analog loopback, the modem may be induced to transmit a signal while the loopback is activated, ostensibly to establish a connection for a communication session with a remote modem but in the usual manner, actually for testing the device by returning the signal to its own receiver to determine that the modem is operating properly, using its own transmission. Among the advantages of this capability is that the transmitter can be turned on and used to test its transmit functions, even if the modem is an originate entity. Another advantage is that through a knowledge of the location of the external analog loopback, if the modem successfully tests itself (not through its normal self-test procedure, but through the loopback) and passes data, then the communication link is confirmed to be "good" (i.e., operating properly) to the point of the loopback location.

The external analog loopback feature is preferably made operative without regard to whether the modem is in the originate mode or the answer mode. Normally, the transmitter clock source would not change when entering the external analog loopback mode. Self test operation may be enabled while the system is in the latter mode, and if self test is active, clock operation may change to match the requirements of that test.

Therefore, it is a more specific object of the invention to provide an improved technique for troubleshooting four wire leased line facilities which use V.32 modems, in which the V.32 modem is placed in an external analog loopback mode without use of the conventional connection between the transmitter and the receiver.

Still another object is to provide a testing technique for a leased line link to a data network, in which the link uses unbalanced modems, to allow the circuit to be tested in such a way that the modem at the remote site may be determined to be operating properly or not, up to an external analog loopback.

BRIEF DESCRIPTION OF THE DRAWINGS

The above and still further objects, features, aspects and attendant advantages of the present invention will become apparent from a consideration of the following detailed description of a presently preferred embodiment thereof, taken in conjunction with the accompanying drawings, in which.

DESCRIPTION OF THE PRESENTLY PREFERRED EMBODIMENT

Figure 1:
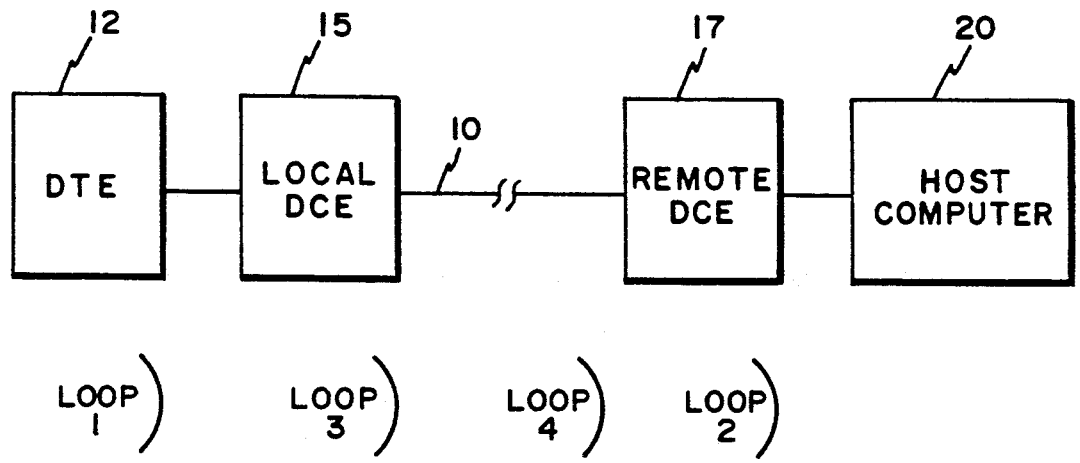
FIG. 1 is a simplified block diagram of a four wire facility in which the present invention may be utilized.

Referring now to FIG. 1, the CCITT, which is the standards-setting international consultative committee for telecommunications, has specified the standard of four loopbacks in a data communication link utilizing a four-wire facility. In the link of FIG. 1, the facility 10 is typically a line which is leased by the customer of the data network from the local telephone company. Loop 1 is in the DTE 12, loop 2 is in the remote Data Communication Equipment (DCE) 17, loop 3 is in the local DCE 15, and loop 4 is in a separate piece of test equipment on the leased facility, such as the system supplied by Western Electric Company as the "829".

Of these loopbacks, an existing system might use loop 2 and loop 3 primarily, for example. It is usually necessary when a system failure occurs, to isolate whether the source of the problem exists in the leased line 10, which would be the particular telephone company's responsibility, in contrast to the local user's (customer's) or equipment supplier's responsibility for the remote site. If the problem exists at the remote site, whether in the modem, the host system or the wiring, it is necessary to dispatch a person to that location, which is costly because it requires human intervention. If the cause is not present at the remote site, that cost is incurred by the responsible party without enjoying the corresponding benefit of correction of the failure.

Figure 2:
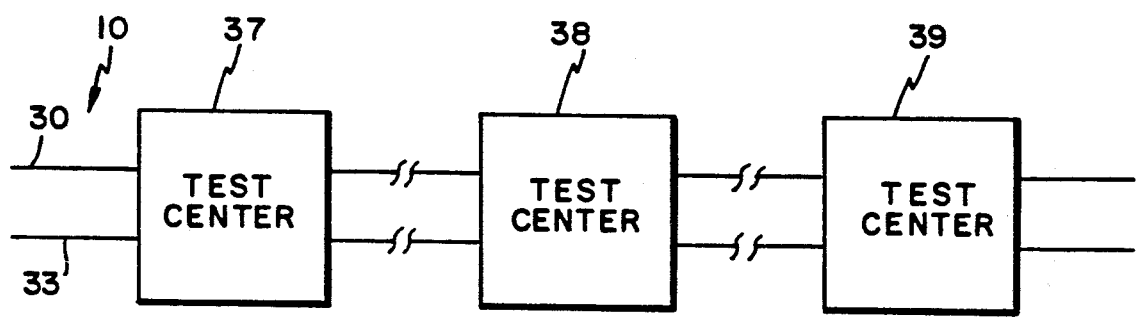
FIG. 2 is a simplified diagram illustrating a current technique employed by the facility administrator for testing and isolating failures on sections of the leased line.

Referring to FIG. 2, the leased line facility 10 typically has a transmit path 30 and a receive path 33, each of which is two-wire (and therefore, provides a four-wire line). Also, the facility may also be provided by the telephone company with a number of test centers 37, 38, 39 and so forth along its path, so that in the event a transmission problem arises the facility may be tested sectionally through loopbacks at these test locations (manned or unmanned) to isolate the problem to a particular section of the line. The loopbacks are activated in a known manner when it is desired to test a section of the facility.

Figure 3:
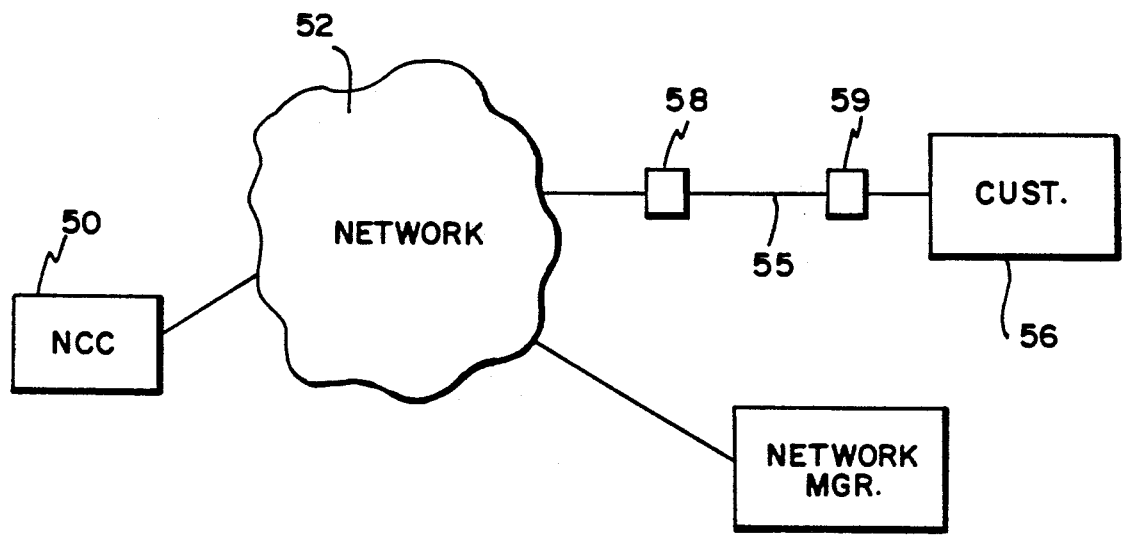
FIG. 3 is a simplified diagram of a data network with an exemplary link to a remote customer site.

FIG. 3 is a simplified diagram to illustrate a typical (and conventional) network management system with which the present invention may used. A network control center 50 is connected to a data network 52. By way of example, a link 55 coming off of the network to a customer site 56 has a pair of V.32 modems 58, 59, one at each end of the link which includes the leased line facility. The modem may be used to transmit tones for testing purposes, and control of that function would typically be handled by a network manager in the form of hardware and software to, among other things, institute a testing function when a failure occurs. Standard loopbacks may also be controlled through the DTE interface Network control center 50 may be used to issue a command to a modem on link 55 to turn the transmitter on.

As noted above, in a standard system a V.32 modem which is transmitting cannot recognize its own receiver. This requires that a special configuration be used which allows the transmitter to talk to its own receiver, and the connection is typically made internally. This is referred to as analog loopback, and is a conventional technique (constituting CCITT loop 3). The present invention conditions the transmitter and receiver in exactly the same way, but maxes the connection externally rather than internally. This provides an advantage of allowing the facility to be tested to determine whether everything is working properly. More importantly, other advantage arise from the fact that the standard V.32 modem system is unbalanced, with an originate side and an answer side. Once the call connection is sought to be established, the originate side of the modem is completely silent until it receives a confirmation signal from the answer side. This creates the problem that if one side of the leased line is down neither side transmits. Accordingly, it becomes extremely difficult to attempt to trouble shoot a system which uses such unbalanced modems, such as the V.32 technology.

This situation is a departure from the previous technology for four-wire modems, which based on V.29 and V.27, both of which transmit at all times from both ends. Those types of modems are independent but are balanced in that both ends do the same thing at the same time. In contrast, V.32 is really a dial technology which has been moved into four-wire leased line technology, resulting in some problems and specifically with remote testing.

Figure 4:
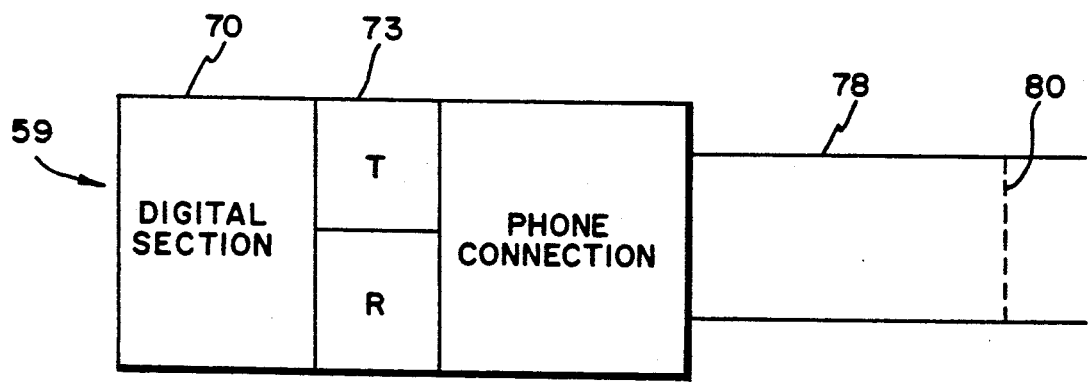
FIG. 4 is a block diagram illustrating the presently preferred embodiment of the invention.

Referring now to FIG. 4, the V.32 modem, say 59 at the remote site, has several sections. Very simply, there is a digital section 70, a digital-to-analog section 73 (including both transmit and receive) which gets the information ready for the phone line, and finally the phone connection circuitry. If the loopback is in the phone connection circuitry, it bypasses many of the sources of the failure. Non-V.32 modems are able to and do use such an internal loopback in the phone connection circuitry. But because of the unbalanced nature of the V.32 modem, the standard analog loopback is ineffective. By placing the analog loopback externally of the modem, the cause of the failure may be isolated to the entire leased line facility, short of the modem.

Such an external analog loopback is illustrated on communication line 78 at phantom line 80. The loopback 80 is placed at a location which is sufficiently close to the V.32 or other unbalanced modem, to isolate the location of the source of the failure. A typical situation, for example, is one in which the customer equipment is located in the upper stories of a large building. In such a case, the external analog loopback may be located one or more stories below the customer equipment on the local line or "drop". Alternatively, the loopback may be close to the modem but outside it. In any event, the location is not on the leased line itself. The loopback is used in a conventional manner to isolate the location of a failure, and in particular to ascertain whether it occurred at the modem end or on the leased line itself. With this knowledge, responsibility for correction of the failure can be assigned to the proper party, whether it is the customer or its equipment supplier, or the local telephone company.

The external analog loopback is normally inhibited, but may be activated from the network control center, the network manager, or within the DTE itself. With the loopback 80 activated, the modem 59 is instructed from the network control center to transmit a signal of the same type normally used to establish a connection for a communication session with a remote modem and host computer or other destination equipment or device. Instead, however, the loopback serves to test the modem by returning the signal to its own receiver to determine whether the modem is functioning properly, using its own transmission. Knowing the location of the loopback in the link, if the modem is determined to pass data, the proper operation of the communication link may be verified to the point of the loopback location.

On the other hand, if the modem is not operating properly, the location of the failure in the local link has nevertheless been isolated and the responsibility identified. It is then a simple matter to trouble shoot further to determine the exact location and cause of the failure.

Although a presently preferred embodiment of the invention has been described, it will be apparent to those skilled in the art to which the invention pertains from a consideration of the foregoing disclosure that variations and modifications of the disclosed embodiment may be effected without departing from the true spirit and scope of the invention. Accordingly, it is intended that the invention shall be limited only as and to the extent required by the appended claims and the applicable rules and principles of law.

What is claimed is:

1. A method of providing troubleshooting capability in a four wire telephone line employing a V.32-type or other unbalanced modem in a local communication link at one or both ends of the telephone line for a data network, each modem having its own transmitter and receiver, which comprises:

installing an activatable but normally inhibited analog loopback externally of the modem within the local link with which the modem is associated, with no loopback connection between the transmitter and the receiver within the modem itself, and activating the external loopback and inducing the modem to transmit a call connection signal so that by virtue of the external loopback the signal is fed back to the receiver of the same modem to permit testing of the operativeness of the modem and the related portion of the link.

2. The method of claim 1, wherein
   the external loopback is activated from terminal equipment on the local link with which the modem is associated.

3. The method of claim 1, wherein
   the external loopback is activated from a point of the network remote from the local link with which the modem is associated.

4. Apparatus for assisting troubleshooting capability in a four wire telephone line employing a V.32-type or other unbalanced modem in a local communication link at one or both ends of the telephone line for a data network, each modem having its own transmitter and receiver, said apparatus comprising:

an activatable but normally inhibited analog loopback located externally of the modem within the local link with which the modem is associated, with no loopback connection between the transmitter and the receiver within the modem itself, and means for activating the external loopback while the modem is induced to transmit a call connection signal, whereby the signal is fed back through the external loopback to the receiver of the same modem to permit testing of the operativeness of the modem and the related portion of the link.

5. The invention of claim 4, wherein
   the activating means is within the terminal equipment on the local link with which the modem is associated.

6. The invention of claim 4, wherein
   the activating means is located at a point of the network remote from the local link with which the modem is associated.

* * * * *